United States Patent [19]

Sicignano et al.

[11] 4,238,529

[45] Dec. 9, 1980

[54] LONG WAVE-LENGTH X-RAY DIFFRACTION CRYSTAL

[75] Inventors: Albert Sicignano, Mount Kisco, N.Y.; William P. Zingaro, deceased, late of Hartsdale, N.Y.; Josephine Zingaro, executrix, Scarsdale, N.Y.

[73] Assignee: North American Philips Corp., New York, N.Y.

[21] Appl. No.: 63,015

[22] Filed: Aug. 2, 1979

Related U.S. Application Data

[60] Continuation-in-part of Ser. No. 873,418, Jan. 30, 1978, abandoned, which is a division of Ser. No. 755,683, Dec. 20, 1976, Pat. No. 4,084,089.

[51] Int. Cl.$^3$ .................. G01N 23/20; B05D 1/20; B05D 1/36
[52] U.S. Cl. .................................................. 427/160
[58] Field of Search .................................... 427/160

[56] References Cited

U.S. PATENT DOCUMENTS

| | | | |
|---|---|---|---|
| 3,518,427 | 6/1970 | Cotterill | 250/276 |
| 3,591,803 | 7/1971 | Spielberg | 250/276 X |

*Primary Examiner*—James R. Hoffman
*Attorney, Agent, or Firm*—Marc D. Schechter

[57] ABSTRACT

An x-ray diffraction crystal for the analysis of x-rays comprisng at least two insoluble monolayers of (i) a first divalent metal soap, separated by (ii) at least one monolayer of either a fatty acid alone, or of a second divalent metal soap, the second metal having a lower atomic number than the first metal.

Such crystals are formed by alternately raising and lowering a solid substrate through the monolayer-covered liquid surfaces of the first divalent metal cation soap monolayer, and the second divalent metal cation soap monolayer or fatty acid monolayer.

4 Claims, 3 Drawing Figures

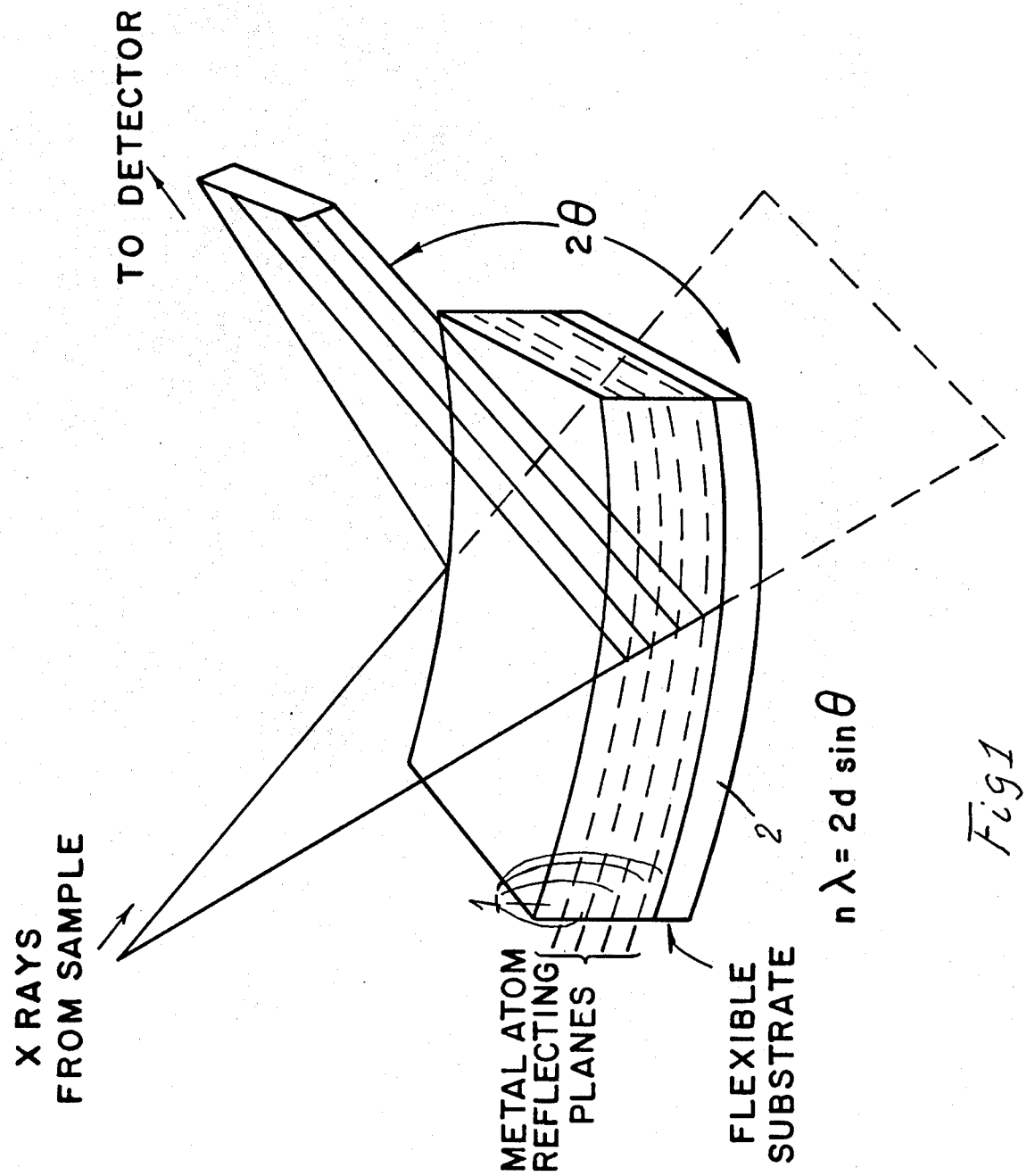

LONG WAVE-LENGTH X-RAY DIFFRACTION CRYSTAL

This is a continuation-in-part of application Ser. No. 873,418, filed Jan. 30, 1978, now abandoned, which was a division of application Ser. No. 755,683, filed Dec. 20, 1976, now issued as U.S. Pat. No. 4,084,089.

BACKGROUND OF THE INVENTION

This invention relates to an x-ray diffraction crystal for analyzing long wavelength x-rays, i.e. x-rays having a wavelength of at least 50 Angstroms, and to a method of making such crystals.

X-rays having wavelengths greater than about 10 Å are generally known as soft x-rays and are detected using a wavelength dispersive spectrometer with a crystal as a dispersive element. X-ray spectroscopy below 1 keV would allow identification of elements with atomic numbers below 10 and surface analysis at a depth of 10–1,000 Å since soft x-ray photons occur below 1 keV, or wavelengths greater than 12.4 Å.

Langmuir-Blodgett multi-layer pseudo-crystals are generally used as a dispersive element. Each layer is a monomolecular layer of a heavy metal soap. The distance between the heavy metals is determined by the chain length of the fatty acid. The distance determines the maximum x-ray wavelength which can be resolved. The heavy metal, i.e. the cation, determines the intensity of the diffracted radiation and the intensity is directly related to the atomic number of the cation.

The most commonly used pseudo-crystal is lead stearate wilth a 2d (d being the interplanar distance) spacing equal to 100 A. Longer "d" spacing crystals using lignoceric acid, and the like can be made but are extremely difficult to build.

SUMMARY OF THE INVENTION

It is a principal object of the invention to provide a new, multilayer Langmuir-Blodgett crystal capable of diffracting x-rays of at least twice the wavelength of state of the art crystals.

It is another object of the invention to provide a method of making multilayer Langmuir-Blodgett crystals capable of diffracting x-rays of at least twice the wavelength compared to the state of the art crystals.

These and further objects of the invention will appear as the specification progresses.

In accordance with the invention the crystal consists of alternate monolayers of a first, heavy divalent metal soap, and monolayers of either a fatty acid alone or a second, lighter divalent metal soap. Selecting cations with a significant difference in atomic number and dispersing power, such as Pb and Be, Mg, Ca, etc., increases the effective 2d spacing of the crystal since the Pb planes cause the predominant x-ray diffraction. Thus, the terms "heavy" and "lighter", as used above in modifying "divalent metal", mean that the "heavy metal" is chosen to have a higher atomic number than the "lighter metal". The sequence of the fatty acid or lighter metal soap monolayers between the heavy element layers gives the 2d spacing. Thus, for stearic acid or metal-stearate monolayers, $$2d = 100 \text{ Å} + N(100 \text{ Å}); N = 1, 2, 3, \ldots$$

where N represents the number of layers placed between the heavy metal soap layer pairs.

Preferably, the heavy metal soap is a lead salt of a fatty acid such as lead stearate, and the other monolayers, separating the heavy metal soap monolayers, are beryllium stearate, magnesium stearate, calcium stearate or stearic acid.

These crystals are built up in accordance with the invention, for example, by depositing in the desired pattern on a solid substrate, monomolecular layers of Pb-stearate and layers of a lower atomic number metal stearate or a fatty acid. Thus, a fatty acid, for example stearic acid, in, for example, an n-hexane solution is placed on the surface of two separate water solutions containing, respectively, either (a) the heavy metal cation or (b) the lighter metal cation or no metal cation at all. After the n-hexane evaporates, a surface monolayer of the metal stearate or the fatty acid (where no metal cation is in solution) is formed. Subsequently, a floating barrier under sufficient pressure tangent to the surface is applied to the monomolecular layer causing the molecules to come together. Substrates, e.g. glass, are mounted vertically to the liquids and are alternately dipped into and lifted out of the liquids at a constant rate transferring monomolecular layers onto the substrates in the desired pattern.

BRIEF DESCRIPTION OF THE DRAWINGS

The invention will be described in greater detail with reference to the accompanying drawing:

FIG. 1, shows a Langmuir-Blodgett pseudo crystal used for reflecting x-rays to a detector;

DESCRIPTION OF THE PREFERRED EMBODIMENTS

Figure 2B:
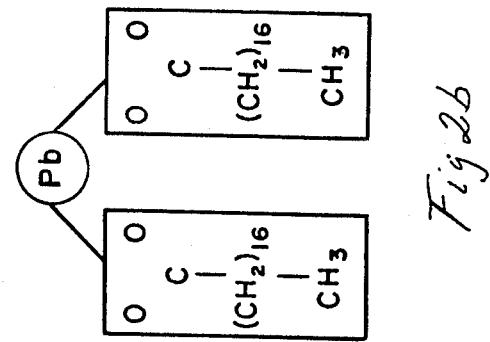
FIG. 2b, shows the molecular structure of lead stearate.
Figure 2A:
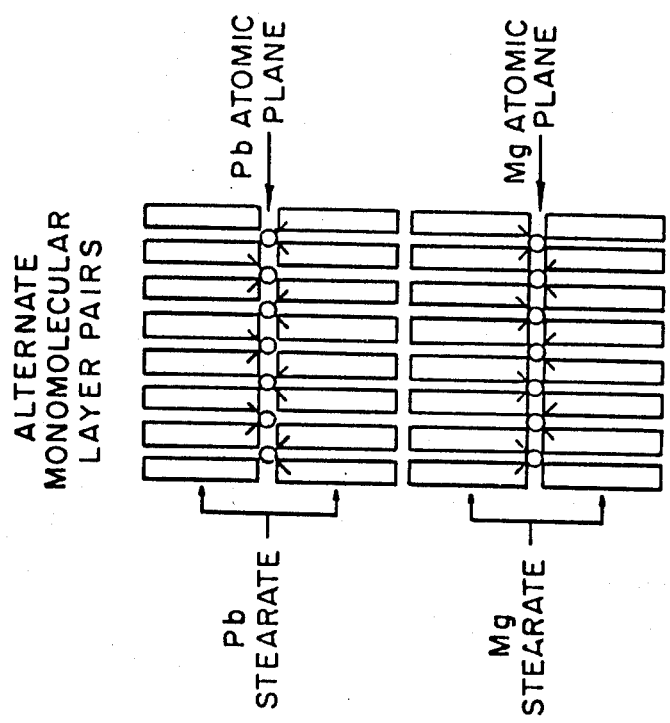
FIG. 2a, shows in greater detail the structure of the crystal.

In FIG. 1, the Langmuir-Blodgett crystal comprises several metal atom reflecting planes 1 supported by a glass substrate 2 as shown. The metal atom reflecting planes are alternate layers of Pb-stearate, the molecular structure of which is shown in FIG. 2b, separated by layers of Mg-stearate (see FIG. 2a).

X-rays from a sample (not shown) excited to fluoresce, either by an electron beam or x-rays, and emit secondary x-rays characteristic of the elements composing the specimen are reflected by the crystal 1 in accordance with Bragg's relationship $$n\lambda = 2d \sin \theta$$

where n is the number of reflecting planes, λ the wavelength of the incident x-rays, d the interplanar spacing, and θ the angle of incidence and reflection of the x-rays.

Since d is fixed, the angle θ will vary directly in response to the wavelength and thus by positioning the detector and measuring the angle θ, the wavelength and hence the identity of the element can be determined.

These crystals are built up in accordance with the invention, for example, by depositing in the desired pattern on a solid substrate, monomolecular layers of Pb-stearate and layers of a lower atomic number metal stearate or a fatty acid. Thus, a fatty acid, for example stearic acid, in, for example, an n-hexane solution is placed on the surface of two separate water solutions containing, respectively, either (a) the heavy metal cation or (b) the lighter metal cation or no metal cation at all. After the n-hexane evaporates, a surface monolayer of the metal stearate or the fatty acid (where no metal cation is in solution) is formed. Subsequently, a floating barrier under sufficient pressure tangent to the surface is applied to the monomolecular layer causing the molecules to come together. Such a barrier may comprise, for example, a styrofoam block to which a tangential force is applied by means of cord or wire. The cord is attached at one end to the block and then extends tangentially to an idler roller and then vertically downward to suspend a constant mass attached to the other end thereof. The gravitational force on this mass is thus transferred tangentially to the floating barrier. Due to this force, the molecules on the surface of each solution are compressed between the floating barrier and the walls of the vessel which contains the solution, thus forming a surface monolayer. Substrates, e.g., glass, are mounted vertically to the liquids and are alternately dipped into and lifted out of the liquids at a constant rate transferring monomolecular layers onto the substrates in the desired pattern.

What is claimed is:

1. A method of manufacturing an x-ray diffraction crystal comprising the steps of:

forming a monomolecular layer of a first divalent metal soap on the surface of a first aqueous solution;

forming a monomolecular layer of either a fatty acid or a second divalent metal soap on the surface of a second aqueous solution, said second metal having a lower atomic number than said first metal; and alternately dipping a substrate in said first and second solutions, each dip transferring a monomolecular layer from the solution to the substrate, so as to form a diffraction crystal having the first metal soap layers separated by one or more fatty acid or second metal soap layers.

2. A method of manufacturing an x-ray diffraction crystal, as claimed in claim 1, wherein each monomolecular layer forming step comprises:

forming a water solution containing the appropriate metal ions or containing no metal ions;

placing a solution of a fatty acid in n-hexane on the surface of the water solution;

allowing the n-hexane to evaporate, thus forming either a fatty acid or a metal soap monomolecular layer on the surface of the water solution; and applying a floating barrier to the surface to cause the molecules of the monomolecular layer to come together.

3. A method of manufacturing an x-ray diffraction crystal, as claimed in claim 2, wherein the first divalent metal is lead and wherein the second divalent metal is one or more metals from the group consisting of beryllium, magnesium, and calcium.

4. A method of manufacturing an x-ray diffraction crystal, as claimed in claim 3, wherein the fatty acid is stearic acid.

* * * * *